Oct. 11, 1932.  L. A. WESTON  1,882,308
GASKET DEVICE
Filed May 22, 1929
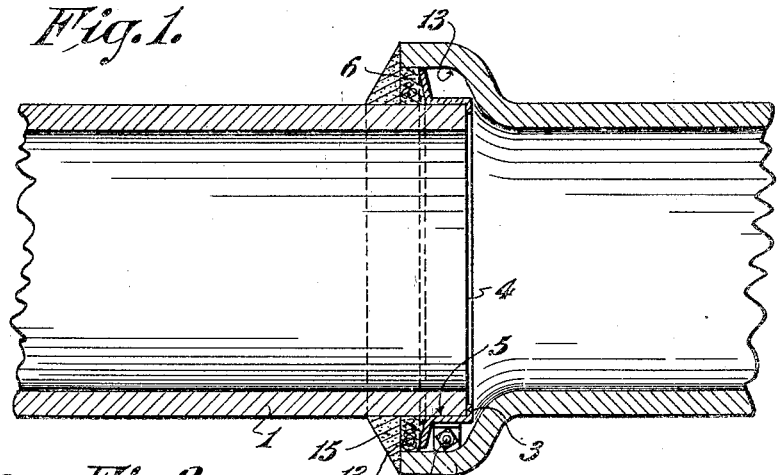
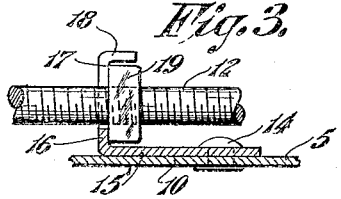
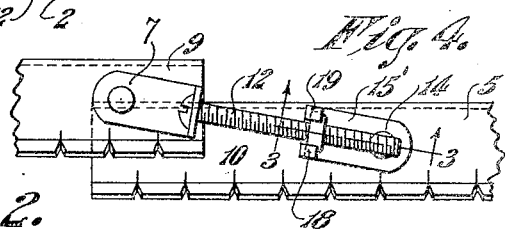
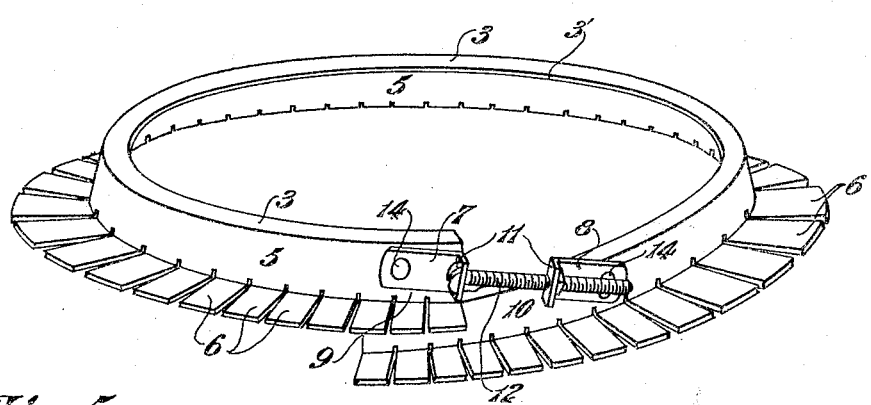
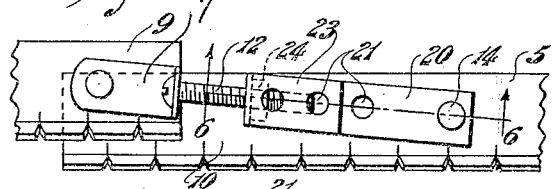
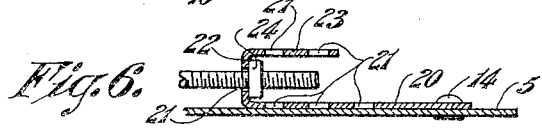
INVENTOR,
Leroy A. Weston,
BY Harry W. Bowen.
ATTORNEY.

Patented Oct. 11, 1932

1,882,308

UNITED STATES PATENT OFFICE

LEROY A. WESTON, OF ADAMS, MASSACHUSETTS

GASKET DEVICE

Application filed May 22, 1929. Serial No. 365,079.

This invention relates to improvements in gasket devices, which are used for forming a watertight joint between the spigot and the bell end of a sewer or waterpipe.

At the present time, it is a common practice to form a watertight joint in sewer pipes by inserting a length of tarred rope in the bell end of the pipe and then inserting the concrete. Oftentimes, the workman fails to thoroughly insert the concrete at the bottom of the bell resulting in a leakage of the joint. The present invention comprises a slitted gasket member that is formed of suitable material, such as sheet metal, having an integral inwardly extending flange that fits over and engages the extreme outer end of the spigot part of the tile and a band portion that engages the circumference of the spigot end a short distance back of the extreme outer end and a second flange portion that is formed with a large number of resilient or bendable fingers by slitting the second flange. These fingers are designed to readily yield when two sections of the pipe are assembled, by inserting the spigot end into the bell end. If there is any unevenness on the inner surface of the bell, these resilient fingers will yield to the unevenness and form a close fit between the two sections of the tile pipe. The means for clamping the band portion of the gasket to the end of the tile comprises a pair of right angular shaped ears, or brackets which are pivotally connected to the adjacent ends of the circumferential band portion of the gasket. Both of the ears are loosely pivoted to the ends adjacent of the gasket. The pivots permit the ears to turn on the band part of the gasket, whereby, if the extreme outer end of the spigot end of the pipe is uneven, it will permit the adjacent and overlapping ends of the gasket to be drawn together towards each other and then clamped in place by means of a screw passing through an opening in the struck-up portion of the pivoted ear. The two ears extend outward a distance substantially equal to the length of the resilient fingers, thus providing means for supporting the spigot end in the bell, as will be described.

Referring to the drawing:

Fig. 1 is a sectional view showing the adjacent ends of two sections of the tile pipe with the gasket in place and the concrete inserted.

Fig. 2 is a perspective view showing the gasket removed and illustrating the movable feature of the ears.

Fig. 3 is a sectional view on the line 3—3 of Fig. 4 showing a modification of the pivoted ears or brackets.

Fig. 4 is a plan view of the pivotal ears, and showing the adjacent ends of the gasket.

Fig. 5 is a plan view of a further modification of the pivoted ears or brackets and the adjacent ends of the gasket, and Fig. 6 is a sectional view on the line 6—6 of Fig. 5.

Referring to the drawing in detail:

1 designates the spigot end of a tile and 2 the bell end of an adjacent tile, shown assembled. The gasket is formed with the inwardly extending flange portion 3, which is placed on the extreme outer end 4 of the member 1. The smooth end 3' is due to the bending of the sheet metal by the rollers. 5 is the continuous band portion of the gasket, which engages the circumference 6 of the member 1. At right angles to the band portion 5 are a series of elastic fingers 6, which are formed by slitting the same. 7 and 8 are two right angular shaped ears that are secured to the adjacent ends 9 and 10 of the band 5. One of the ears, as 8, is pivotally connected to the band. Each of the ears has struck-up portions 11 with openings to receive the adjusting bolt 12.

The gasket device is assembled as follows: The flange 3 is placed against the outer end 4 on the spigot 1. The bolt 12 is then tightened to draw the adjacent ends 9 and 10 toward each other, whereby the band 5 is firmly clamped to the spigot end of the member 1. The spigot member 1 is now inserted into the bell part 2, with the flexible fingers 6 engaging the inner surface 13 of the bell. Any unevenness of the bell portion will cause the fingers to yield, or bend, and substantially close the space between the ends of the fingers and the inner surface of the bell. It will be noticed that in the event of any unevenness in the end 4 of the spigot member 1, the pivoted ears 7 and 8 will turn on their pivots 14, as shown in Fig. 2. After the parts are assembled with the portions 11 of the ears on the lower side of the pipe, the concrete 15 is inserted.

Referring to Figs. 3 and 4, 15' designates an ear that is pivotally secured by the pivot 14 to the end 10 of the band 5. The ear 7 is also pivoted to the adjacent end. This is formed with the struck-up end 16 having an opening 17 therein to receive the tightening bolt 12. 18 are inwardly extending prongs or overhanging ends for confining the nut 19 under these ends, as shown.

It will therefore be seen that the ears 15' and 17 can turn when there is any unevenness of the end 4 of the spigot end member.

Referring to Figs. 5 and 6 which show a further modification of the adjustment, 20 is a strip of sheet metal having a series of spaced openings 21 formed therein. This strip is pivotally secured to the end 10 of the band 5 by means of the pivot pin 14. This strip —20— is pivotally attached at one end to the band 5, as shown. This strip is folded to form the end portion 22 with one of the openings 21 therein to receive the adjusting bolt 12. 23 designates an overhanging part to form a recess to receive the nut 24. This strip —20— can, of course, turn on the pivot pin 14, in order to compensate for any unevenness of the end 4 of the spigot member.

It will be seen from this description that I have provided a gasket device for efficiently closing the annular space between the bell and spigot ends of the pipe, and one that is readily adjustable and inexpensive to make and install.

What I claim is:

1. As an article of manufacture, a gasket having a series of radially extending resilient finger elements, a band portion at an angle to the finger elements, brackets pivotally connected to the band portion and formed with openings, a bolt in the openings for drawing the band ends together, and an inwardly extending flange parallel with the finger elements, for engaging the outer end of a spigot part of a tile pipe, the brackets being pivotally secured to the band and the bent portions of the brackets being substantially equal in length to the flexible fingers.

2. A gasket for sewer pipes comprising a one piece circular member with over-lapping ends and having two parallel portions, one of which is slitted to form finger elements, said portions being connected with a part that is substantially right angles to the parallel portion, and means on the overlapping ends for adjustably securing the gasket in place on the spigot end of the pipe, said means comprising brackets pivotally connected to the said ends with their outer edges flush with the outer edges of said finger elements and a bolt in the brackets.

3. A gasket for the purpose described comprising a split band member, a plurality of integral resilient finger elements extending outwardly from a side edge of said band member, an integral flange extending inwardly from the opposite side edge of said band member, a bracket member pivotally secured to an end of said band member and formed with an opening, a second bracket member provided with a bendable free end pivotally secured to the opposite end of said band member and formed with a plurality of spaced openings in said end, a rotatable bolt located in the openings of said bracket members, a nut located in the bendable free end and threadably secured on said bolt, the bendable portion on said second bracket member operating for securing the nut from turning, the outer edge of the first-named bracket member and the outer surface of the bent portion of the second bracket member being nearly flush with the outer edges of said finger elements.

LEROY A. WESTON.